Feb. 2, 1965 S. GREEN 3,168,205
MOBILE PLATFORM INCORPORATING ELEVATIONALLY ADJUSTABLE CONVEYOR
Filed March 8, 1963 2 Sheets-Sheet 2

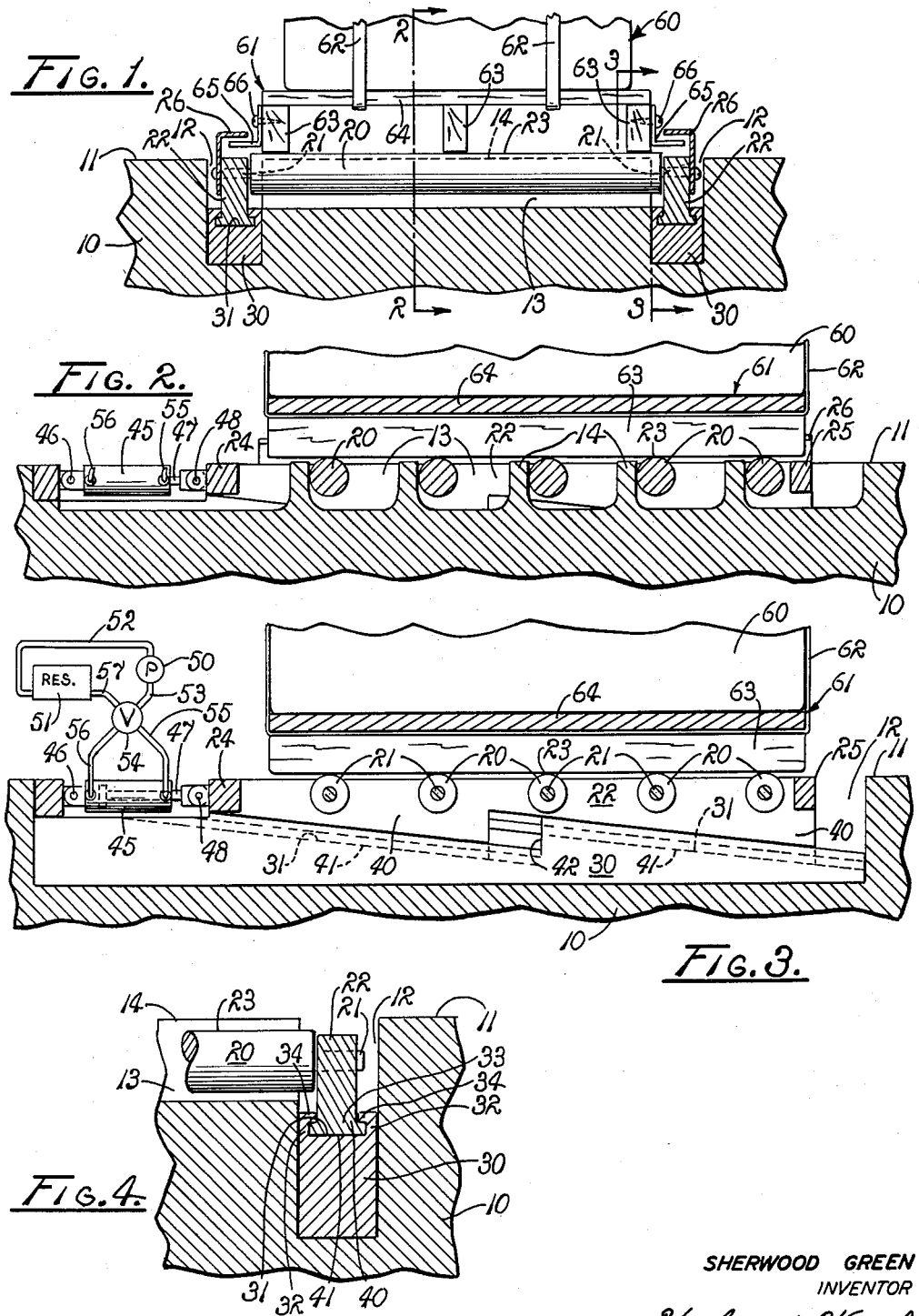

SHERWOOD GREEN
INVENTOR

Huebner & Worrel
ATTORNEYS

United States Patent Office 3,168,205
Patented Feb. 2, 1965

3,168,205
MOBILE PLATFORM INCORPORATING ELEVATIONALLY ADJUSTABLE CONVEYOR
Sherwood Green, P.O. Box 109, Madera, Calif.
Filed Mar. 8, 1963, Ser. No. 263,912
7 Claims. (Cl. 214—84)

This invention relates to a platform adapted to support load units thereon and incorporating means permitting selective shifting of the load units. The invention also relates to such a platform provided with means to lock the load units in respective, selected positions on the platform subsequent to such shifting.

Contemporary practices in the art of transporting package goods and single items of manufacture include the method of fastening a package or an item to a portable support member, known as a pallet. In employing such a method, an individual container or item of manufacture is secured to the pallet by suitable means, such as commercially available steel strapping, thereby to form a palletized load unit. Such pallets conventionally are in the form of an integral horizontally disposed floor supported by three laterally spaced, longitudinally extended battens.

In handling such palletized load units preparatory to shipment, conventional fork lift trucks are ideally suited to lift and to deposit such palletized load units upon a load platform of a transporting vehicle. Such fork trucks are employed in loading not only ground traversing vehicles, such as trucks and railroad cars, but also aircraft, boats and other water traversing vessels. Regardless of the type of mobile vehicle providing the load supporting platform a common problem exists in readily positioning such palletized load units preparatory to shipment.

Prior to the present invention, such palletized load units normally were positioned on the load platform by the particular lifting device employed, or were manually positioned subsequent to deposition on the platform. If manually positioned, the load units must necessarily be skidded over the surface of the platform or moved by the use of small dollies provided for this purpose. Such procedures greatly increase the unit cost of shipment of such load units, as well as result in unnecessary wear and/or damage to both the supporting platform and the pallets.

Another common problem is that of dependably maintaining the load units in a selected position after depositing such units on the platform. Previously known methods of securing such load units to a platform include clamping devices and tie down elements such as ropes, cables, and the like. In all events, such methods of securing the load units to the platform require a considerable amount of time for each unit and must be done with precise care to prevent shifting during transport by the mobile platform. This is particularly true in the case of load platforms traveling at a high rate of speed and subjected to frequent and/or sudden stops wherein deceleration forces are quite high.

Accordingly, it is an object of the present invention to provide a load platform incorporating means to permit selective movement of load units deposited thereon.

Another object is to provide a load platform incorporating a conveyor therein thereby to support load units and to facilitate ready movement of the units relative to the platform.

Another object is to provide a load platform with a load unit conveyor incorporated therein and including means to shift the conveyor between elevated and retracted positions.

Another object is to provide a mobile load platform with locking means to prevent shifting of load units deposited on the platform.

A further object is to provide a mobile platform with a load unit conveyor adapted for movement between elevated and retracted positions, including power means to lock the conveyor in a selected position of elevation as well as to secure the load unit to the platform, and including an arrangement of structural elements to preclude release of the load unit in the event of failure of the power means.

These, together with other objects, will become more fully apparent upon reference to the following description and accompanying drawings.

In the drawings:

FIG. 1 is a fragmentary view of a load supporting platform embodying the principles of the present invention and taken in a vertical transverse plane relative to a conveyor thereof.

FIG. 2 is a view of the load platform of FIG. 1 taken in a vertical longitudinal plane indicated by the lines 2—2 of FIG. 1.

FIG. 3 is a view similar to FIG. 2 taken on line 3—3 of FIG. 1, and showing schematically a fluid pressure system employed in the invention.

FIG. 4 is an enlarged fragmentary view of the conveyor shown in FIG. 1.

Figure 5:
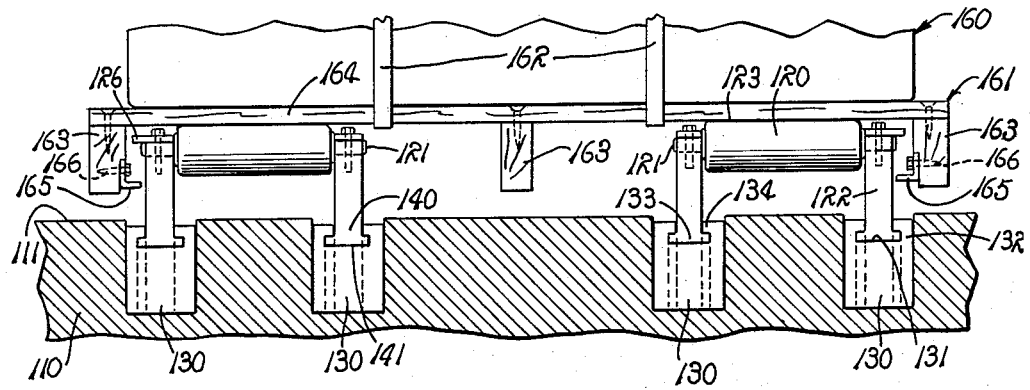
FIG. 5 is an illustration of a second form of the invention showing a load unit supported on a conveyor and taken in a transverse vertical plane relative to the conveyor.

Referring in greater detail to FIGS. 1 through 4 of the drawings, a load supporting platform is illustrated fragmentarily at 10 and provides a plane surface of support 11 adapted to uphold a load unit thereon. The invention is primarily intended for use in mobile platforms, such as those incorporated in vehicles such as conventional railroad cars and trucks adapted for the shipment of freight, as well as the floors and decks of aircraft and water traversing craft. In such vehicles, the mobile platform normally is arranged for movement in a predetermined direction. To accommodate such a direction of travel, the present invention is ideally suited for mobile platforms having a normal direction of movement from left to right, as viewed in FIGS. 2 and 3. Accordingly, when subjected to acceleration forces increasing the velocity of the platform, any item resting upon the surface 11 tends to move relative to the surface 11 from right to left, as viewed in the drawings, due to the inertia of the item. Conversely, upon negative acceleration, or deceleration, of the platform 10, such an item tends to move from left to right, as viewed in the drawings. The significance of such relative movement will be discussed subsequently in relation to the locking means employed by the invention and serving to maintain the relative position of an item deposited upon the surface 11.

In the first form of the invention, the plane surface of support 11 of the platform 10 is interrupted by a plurality of laterally opposed longitudinally extended channels 12 and a plurality of longitudinally spaced transversely extended grooves 13, interconnecting the channels. Accordingly, the surface 11 is not continuous. A supporting surface is provided in an area intermediate the channels by a plurality of longitudinally spaced ribs 14, transversely extended between the channels.

A plurality of longitudinally extended cylindrical rollers are individualy received within the grooves 13 and supported for individual rotation by means of axially projecting bearing pins 21 individually supported in a pair of laterally opposed, longitudinally extended frame members 22. The frame members 22 are individually received in the channels 12, and are adapted by means subsequently to be described, for movement between elevated and retracted positions. In such a retracted position, the frame members 22 are received within the channels 12 so as to be disposed below the plane of the surface 11. Each of the cylindrical rollers 20 provides a respective surface of support 23 generated about the individual axis provided by the bearing pins 21. When the frame members 22 are moved to a retracted position, the surface of support 23 of the individual rollers is also retracted to a position wherein the uppermost portion thereof is disposed below the plane of the surface 11. Such a retracted condition is fragmentarily illustrated in FIG. 4, whereas FIGS. 1 through 3 illustrate an extended position. The longitudinally extended frame members 22 are interconnected by respective fore and aft transverse frame members 24 and 25. These interconnected members consitute a support frame for the conveyor formed in conjunction with the rollers 20. The support frame carries a pair of laterally opposed locking flanges 26, which are individually inwardly directed in the form of the invention illustrated in FIG. 1.

A pair of laterally opposed ramp blocks 30 are rigidly secured to the platform 10, and provide individual, tapered, upwardly disposed bearing surfaces 31. As can be seen in FIG. 3, a plurality of such ramp blocks are disposed in each of the longitudinally extended channels 12 in the platform, and each block affords a tapered surface inclined downwardly in a direction coinciding with the line of action of the greatest anticipated acceleration forces. As stated above, the greatest of such forces are anticipated in a direction from left to right, incident to stopping or deceleration of the vehicle, not shown, which affords the mobile platform 10. Each of the blocks 30 is provided with a longitudinally extended groove 33 of a cross-sectional configuration of an inverted T. Embracing the groove of each respective block 30, is a pair of laterally opposed retaining flanges 34, integral with the block.

Each of the longitudinally extended frame members 22 is provided with an inverted T-shaped depending portion 40, individually received in a respective one of the grooves 33 afforded by the blocks 30. Each of such depending portions 40 is provided with a downwardly disposed inclined bearing surface 41 adapted to rest upon and be supported by the bearing surface 31. Accordingly, upon relative longitudinal movement occurring between the frame members 22 and the ramp blocks 30, elevational movement of the support frame and the conveyor results. Upon movement of the frame from right to left, as viewed in FIGS. 2 and 3, upward elevational movement of the support frame to an extended position, as shown, results. Conversely, movement of the support frame from left to right causes downward movement to a retracted position, such as that shown fragmentarily in FIG. 4. A stop 42 is provided on one of the bearing blocks to limit the range of movement from left to right upon engagement by an abutting depending portion 40 of the frame members 22.

A power means, illustrated in the form of a pressure fluid ram 45 is provided to effect desired longitudinal movement of the frame and consequent elevational movement between the retracted and elevated positions, as well as any desired intermediate positions. The ram 45 is connected at its cylinder end to the platform 10 by a pivot pin 46. A piston rod 47 projects from the opposite end and is connected to the front transverse member 24 of the support frame by a pivot pin 48. A pump 50 is schematically illustrated as a source of fluid pressure and supplied with pressure fluid from a reservoir 51 by means of an inlet conduit 52. An outlet conduit 53 supplies fluid under pressure to a conventional four-way control valve 54, selectively to control flow of pressure fluid to cylinder lines 55 and 56 and a return line 57 in communication with the reservoir 51. The power means and pressure fluid system is ideally suited for use with commercially available, hydraulic fluids, and accordingly, is readily adaptable for use with present-day aircraft, most of which include hydraulic circuits.

A load unit 60 is fragmentarily illustrated in FIGS. 1, 2 and 3 as being supported on the respective surfaces of support 23 afforded by the individual rollers 20. It will be apparent, that upon lowering of the support frame and the rollers 20 to a retracted position, the load unit rests upon the plane surface of support 11 provided by the platform 10. The load unit 60 includes a conventional pallet 61 to which it is secured by a plurality of straps 62, which in commercial form are narrow bands of flexible steel. The pallet 61 includes three laterally spaced battens 63 secured to an integral floor 64. The two battens along the edges of the pallet are each provided with respective anchorage flanges 65 rigidly secured to its respective batten by a plurality of lag screws 66. The anchorage flanges 65 are adapted to be engaged by the locking flanges 26 carried by the support frame.

Operation

The operation of the described embodiment of the subject invention is believed to be readily apparent and is briefly summarized at this point. Assuming that the platform 10 is mounted in the vhicle so as to provide mobility normally progressing in a direction from left to right, as viewed in FIGS. 2 and 3, the pressure fluid system is activated by appropriate operation of the pump 50 and selective movement of the control valve 54. Accordingly, the pressure fluid ram 45 moves the support frame formed by the longitudinal frame members 22 and the fore and aft frame members 24 and 25 to the left, as viewed in FIGS. 2 and 3. Such longitudinal movement also causes an elevation of the support frame and the individual rollers 20 mounted therein, due to the inclined bearing surface 31 afforded by the ramp blocks 30. The amount of elevational movement is controlled by the angular inclination of the bearing surfaces 31 relative to the plane surface 11 afforded by the platform 10. The longitudinal extent of the transverse grooves 13 provided in the platform is determined by the rate of rise of the inclined surface 31 of the ramp blocks 30. Consequently, as the rate of rise of the inclined surface is decreased, the longitudinal extent of the grooves 13 must be increased proportionately.

Upon movement of the support frame to the left a sufficient longitudinal distance to effect elevation of the surfaces of support 23 afforded by the individual rollers 20 above the plane of surface 11, the control valve 54 is positioned to maintain fluid in the ram 45, thereby locking the support frame in its elevated position. A load unit 60 is then deposited upon the conveyor formed by the rollers 20, the deposition of the load unit being performed by any suitable conventional material handling equipment, such as fork lift trucks and the like, not shown. When deposited upon the conveyor, the load unit is positioned substantially longitudinally centrally of the conveyor so as to permit reception of the anchorage flanges 65 below the locking flanges 26 mounted on the conveyor. The load unit is then positioned longitudinally of the conveyor at a selected location on the load platform 10.

Subsequent retraction of the support platform and the rollers 20 by appropriate extension of the ram 45 lowers the conveyor, and consequently the load unit, until the individual battens 63 rest upon the surface of support 11. In the first form of the invention, such surface of support is provided by the transversely extended ribs 14. Further retraction of the conveyor support frame results in engagement of the anchorage flanges 65 by the locking flanges 26. Extension of the ram 45 and retraction of the conveyor support frame is then continued until a predetermined locking force is exerted by the flanges 26 on the load unit 60. Such predetermined force can readily be limited by devices, such as pressure relief valves and the like, well-known to those skilled in the art of pressure fluid systems. The control valve 54 is then positioned to maintain the fluid at opposite ends of the ram 45, thereby locking the conveyor in the selected elevational position and dependably maintaining the load unit 60 relative to the load platform 10.

It will be noted that the inclined surfaces 31 afforded by the ramp blocks are inclined downwardly in a direction corresponding to the line of action of the inertia force acting upon the load unit when a platform is experiencing a negative acceleration, or deceleration. Accordingly, in the event of failure of the pressure fluid system, the load unit tends to be anchored to the platform 10 due to the action of such inertia force urging the platform toward a retracted, locking position.

Second form

The second form of the invention includes a mobile platform 110 provided with a plane surface of support 111. Laterally opposed, longitudinally extended rows of transversely mounted rollers 120 are individually rotatably supported by means of pins 121 mounted in laterally pairs of longitudinally extended frame members 122. Each of the rollers is provided with an individual surface of support 123, the uppermost limit of which is disposed in a common plane substantially parallel with the surface 111. As in the first form, the surface of support provided by the plurality of individual rollers is adapted for selective elevational movement relative to the platform 110. A transverse front frame member 124 is rigidly secured to the longitudinally extended frame members 122 and a rear transverse frame member 125 is likewise rigidly secured to the members 122, thereby forming a support frame which is selectively longitudinally and elevationally positioned relative to the platform 110. The outermost frame members 122 are disposed at a transverse spacing sufficient to accommodate the spacing of conventional pallets. In addition, these outside frame members 122 are each provided with laterally projecting locking flanges 126 rigidly mounted on such individual frame members.

A plurality of laterally spaced longitudinally extended ramp blocks 130 are rigidly mounted in the platform 110 at a transverse spacing coincident with the spacing of the longitudinal frame members 122. The ramp blocks are are also arranged in longitudinally spaced pairs, each of which affords a tapered bearing surface 131 inclined in a direction corresponding to the line of action of the greatest anticipated acceleration forces. As viewed in FIG. 6, the mobile platform 110 normally would be propelled in a direction from left to right. Accordingly, the greatest anticipated acceleration forces are those experienced during stopping or deceleration of the platform, and such acceleration forces have a line of action from left to right, as viewed in FIG. 6. Each of the ramp blocks is provided with a pair of inwardly directed laterally opposed guide rails 132 disposed on opposite sides of a longitudinally extended inclined groove 133, in the form of an inverted T. In such a configuration, each of the ramp blocks 130 affords a pair of laterally opposed retaining flanges 134. Each of the frame members 122 is provided with individual depending portions 140 of an inverted T-configuration, and dimensioned so as to be longitudinally slidably received within the grooves 133 and dependably retained therein by the flanges 134. Each of the depending portions is provided with a downwardly facing inclined bearing surface 41, adapted to engage and to be supported by the bearing surface 131 of the individual ramp blocks 130. A stop 142 is provided at an appropriate location on at least one of the ramp blocks 130 to limit the range of longitudinal movement of the support frame and consequently the maximum downward movement in a retracted position.

Figure 6:
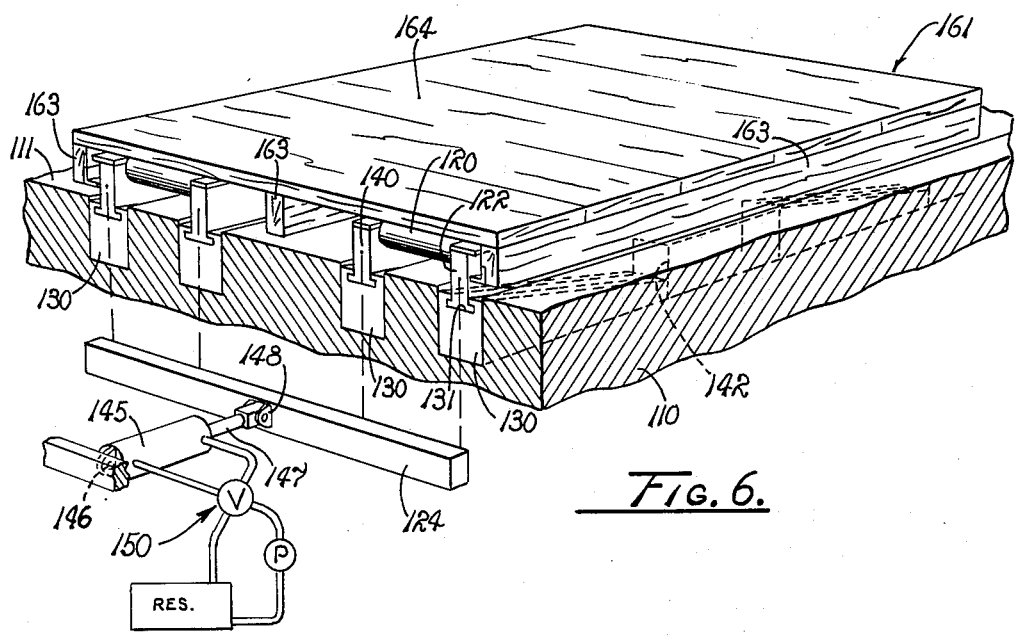
FIG. 6 is a fragmentary perspective view, partly in section, showing the embodiment of FIG. 5, but with only the pallet of the load unit, and incorporating a fluid pressure actuating system which is shown schematically.

Schematically illustrated in FIG. 6 is a pressure fluid system provided in the mobile platform 110, and adapted to effect the above described longitudinal movement of the support frame and consequent selective elevational movement of the rollers 120 and the surface of support provided thereby. The pressure fluid system includes an actuating ram 145 connected at its cylinder end to the platform 110 by means of a pivot pin 146. A piston rod 147 extending from the ram is pivotally connected to the front transverse frame member 124 by means of a similar pivot pin 148. A pressure fluid supply and control system is schematically illustrated at 150 and includes a conventional reservoir as a source of fluid, a pump, a control valve, and suitable conduits, such as those described in connection with the first form.

As illustrated in FIG. 5, a load unit 160 is shown in an elevated position upheld by the surface of support 123 afforded by the rollers 120. The load unit includes a conventional pallet 161 secured to the load resting thereon by means of bands 162. Three transversely spaced, longitudinally extended battens 163 are rigidly secured to a floor 164 so as to provide a central batten and a pair of marginal battens at the lateral edges of the pallet 161. The marginal battens are provided with inwardly directed anchorage flanges 165 individually rigidly secured to the marginal battens by means of lag screws 166.

Operation of second form

The operation of the second form is substantially identical to that of the first form, however, the rollers 120 are arranged to engage the floor 164 of the pallet of the load unit 160. With certain types of pallets of limited longitudinal extent, such a method of supporting facilitates movement along the conveyor afforded by the rollers 120 mounted in the frame members 122.

To facilitate selective positioning of a load unit, the conveyor is moved to an elevated position by the ram 145 prior to depositing such a unit upon the conveyor. Upon the depositing of a load unit upon the conveyor rollers 120, and positioning of such load unit relative to the platform 110, the pressure fluid system 150 is operated to effect movement of the conveyor toward a retracted, locking position. As in the first form of the invention, the locking flanges 126 engage the anchorage flanges 165 secured to the load unit, thereby positively maintaining a selected position of the load unit relative to the platform 110. In addition, the inclined bearing surfaces 131 of the ramp blocks 130 are also arranged in a direction to insure a fail-safe condition with respect to the pressure fluid system. This is accomplished by inclining the bearing surfaces 131 downwardly in a direction aligned with the line of action of the force of inertia acting upon the load unit 160 upon deceleration of the load platform 110.

Accordingly, the present invention provides a mobile load platform with a means permitting rapid, efficient, and safe handling of load units now employed in the transportation industry. In addition, the invention insures maintaining a load unit on such a mobile platform in a pre-selected position, and includes an arrangement of structural elements to lock the load unit in such a pre-selected position, notwithstanding unforeseen failure of the normally employed locking means.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mobile platform affording a substantially plane surface elongated along a predetermined direction and being adapted to uphold a load unit deposited thereon, said load unit affording laterally opposed anchorage apparatus adapted to permit selective shifting of the load unit relative to said plane surface comprising a support frame; a plurality of load engaging members mounted in the frame for rotation about respective individual axes, each of said members affording a surface of support generated about its respective axis; means mounting the frame in the platform for rectilinear movement in a direction parallel to said predetermined direction as well as selective elevational movement relative to said plane surface; power means to effect selective elevational movement of the frame relative to said plane surface, including means locking the frame in a selected elevational position; and load retaining means carried by the frame and adapted to engage said anchorages to retain the load unit in a predetermined location on said plane surface upon retraction of the frame members and lowering of the load unit upon said plane surface.

2. In a mobile platform having a predetermined longitudinal and lateral orientation adapted for normal movement in a predetermined direction and affording a substantially plane surface of support for a load unit, the load unit having laterally opposed anchorage flanges, the combination of a pair of elongated frame members longitudinally extended and laterally spaced in the platform; a pair of longitudinally extended, laterally spaced ramp members mounted in the platform, each of said ramp members affording an upwardly disposed bearing surface inclined at a predetermined angle relative to said plane surface; a plurality of rollers rotatably extended between the frame members transversely thereof and mounted for individual rotation; means mounting each of the frame members on a respective one of said ramp members for selective longitudinal movement thereof thereby effecting elevational movement of the frame members and the rollers between raised and retracted positions; power means connected between the platform and the frame members to effect selective longitudinal movement thereof and consequent raising and retracting of the frame members and the rollers, including means to lock the frame members in a selected position of elevation; and laterally opposed locking flanges individually secured to the frame members and adapted to engage said load unit anchorage flanges upon retraction of the frame members and lowering of the load unit upon said plane surface of support.

3. In combination with a mobile platform affording a substantially plane surface having a predetermined longitudinal and lateral references of orientation and adapted to uphold a load unit deposited thereon and being provided with laterally spaced longitudinally extended receiving channels recessed below said surface, a pair of longitudinally extended, laterally spaced ramp members secured to the platform and received respectively in said channels, each of said members affording respective upwardly disposed bearing surfaces inclined at a predetermined angle relative to said plane surface; a pair of longitudinally extended frame members individually received in said channels, each frame member being provided with a downwardly facing bearing surface engaging said inclined surfaces; a plurality of longitudinally spaced, transversely extended conveyor rollers interconnecting said frame members and rotatably mounted thereon, the platform being provided with a plurality of longitudinally spaced transversely extended grooves individually to receive a respective one of said rollers and to permit limited movement in a direction transversely of their rotational axis and parallel to the longitudinal reference of said plane surface; and power means connected between the platform and said frame members to effect selective longitudinal movement thereof and consequent elevational movement of the conveyors between raised and retracted positions, including means to lock the frame in a selected elevated position.

4. The mobile platform of claim 3 wherein said platform is adapted for normal movement in a predetermined direction and wherein said load unit normally is subjected to deceleration forces having a line of action substantially coincident with said direction of travel, and wherein the bearing surfaces of said ramp members are inclined downwardly from said plane surface in the direction of the line of action of the deceleration forces acting on the load unit.

5. In a mobile platform affording a substantially plane surface to uphold a load unit deposited thereon, apparatus adapted to permit selective shifting of the load unit relative to said plane surface comprising a pair of laterally opposed frame members, each affording respective bearing surfaces; a plurality of cylindrical rollers extended between the frame members and individually mounted for rotation relative thereto, the rollers being spaced longitudinally of the members; a pair of laterally spaced longitudinally extended ramp members mounted in the platform and affording respective bearing surfaces for each of the frame members; means retaining the frame members individually on said ramp members for longitudinal slidable relative movement thereby effecting selective elevational movement of the rollers between predetermined retracted positions and elevated operative conveying positions; and power means interconnecting the platform and said frame members selectively to effect longitudinal movement and consequent elevational movement of the rollers, wherein said platform is provided with recesses individually to receive said frame members and said rollers when in a retracted position.

6. In a mobile platform affording a substantially plane surface to uphold a load unit deposited thereon, the load unit being provided with laterally opposed anchorages, apparatus adapted to permit selective shifting of the load unit relative to said plane surface comprising a pair of laterally opposed frame members, each affording respective bearing surfaces; a plurality of cylindrical rollers extended between the frame members and individually mounted for rotation relative thereto, the rollers being spaced longitudinally of the members; a pair of laterally spaced longitudinally extended ramp members mounted in the platform and affording respective bearing surfaces for each of the frame members; means retaining the frame members individually on said ramp members for longitudinal slidable relative movement thereby effecting selective elevational movement of the rollers between predetermined retracted positions and elevated operative conveying positions; power means interconnecting the platform and said frame members selectively to effect longitudinal movement and consequent elevational movement of the rollers; and load locking means carried by the frame and adapted to engage said anchorages of the load unit upon predetermined movement toward a retracted position.

7. In a mobile platform affording a substantially plane surface to uphold a load unit deposited thereon, the load unit being provided with laterally opposed anchorages, apparatus adapted to permit selective shifting of the load unit relative to said plane surface comprising a pair of laterally opposed frame members, each affording respective bearing surfaces; a plurality of cylindrical rollers extended between the frame members and individually mounted for rotation relative thereto, the rollers being spaced longitudinally of the members; a pair of laterally spaced longitudinally extended ramp members mounted in the platform and affording respective bearing surfaces for each of the frame members, said ramp members each having a longitudinally extended groove of a cross-sectional configuration of an inverted T; each of said frame members having a depending inverted T-shaped portion slidably received in a respective one of said grooves so that the frame members are individually retained on said ramp members for longitudinal slidable relative movement thereby effecting selective elevational movement of the rollers between predetermined retracted positions and elevated operative conveying positions; power means interconnecting the platform and said frame members selectively to effect longitudinal movement and consequent elevational movement of the rollers; and load locking means carried by the frame and adapted to engage said anchorages of the load unit upon predetermined movement toward a retracted position.

References Cited by the Examiner
UNITED STATES PATENTS

| | | | |
|---|---|---|---|
| 1,042,336 | 10/12 | Francis et al. | 214—84 |
| 1,270,086 | 6/18 | Wochner | 214—38.8 X |
| 2,021,503 | 11/35 | Fildes | 214—84 X |
| 2,360,133 | 10/44 | Houssiere | 193—42 |
| 2,895,593 | 7/59 | McKnight et al. | 198—160 |
| 2,949,992 | 8/60 | Weinberg | 214—84 X |
| 3,019,920 | 2/62 | Hillenbrand et al. | 214—84 |

HUGO O. SCHULZ, *Primary Examiner.*
GERALD M. FORLENZA, *Examiner.*